W. RILEY.
Apparatus for Watering Stock.
No. 210,966. Patented Dec. 17, 1878.
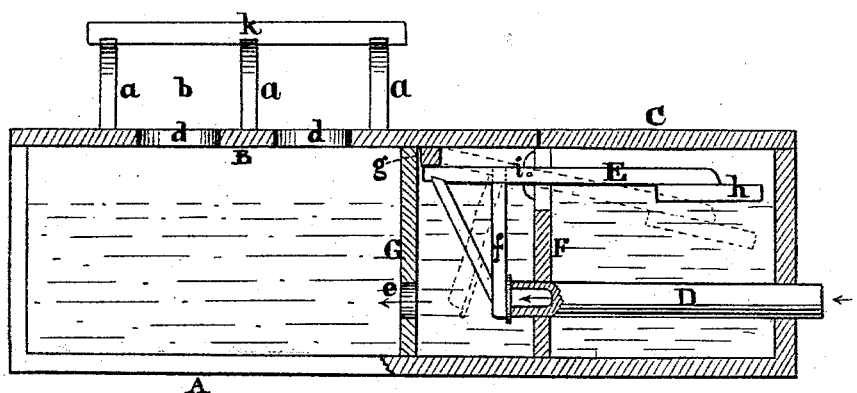
Fig. 1. vert. sec. on line "a a" fig. 2.
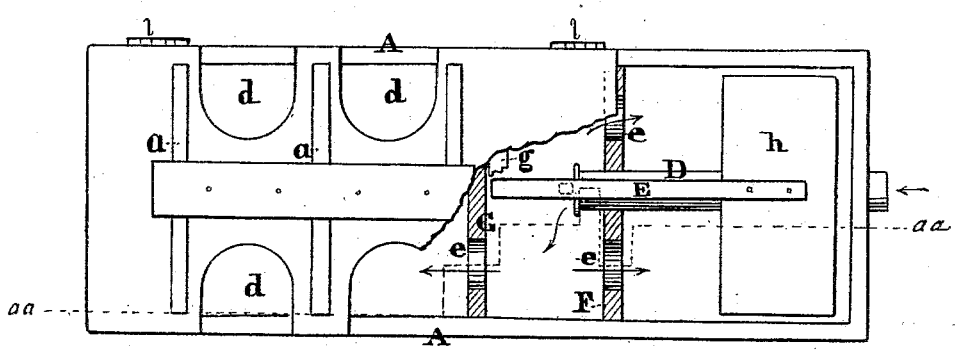
Fig. 2. superficial view; part removed, to show water-ways, "e".
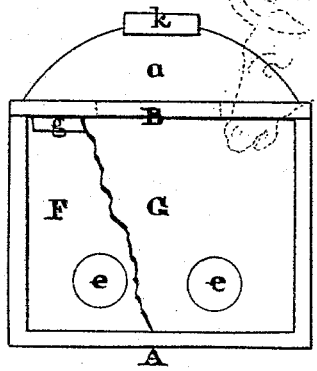
Fig. 3 (end view; "end" removed).
Witnesses
A. J. Benedict
Robert Black
Inventor
William Riley
per J. H. Foy
Attorney

UNITED STATES PATENT OFFICE.

WILLIAM RILEY, OF ATKINSON, ILLINOIS.

IMPROVEMENT IN APPARATUS FOR WATERING STOCK.

Specification forming part of Letters Patent No. 210,966, dated December 17, 1878; application filed April 30, 1878.

*To all whom it may concern:*

Be it known that I, WILLIAM RILEY, of Atkinson, in the county of Henry and State of Illinois, have invented a new and useful Apparatus or Device for Watering Stock, of which the following is a specification:

The invention, as will be seen from the drawing and specification, contemplates a continual supply of fresh water, and that kept at a uniform height in the trough.

Figure 1, vertical section on line $a\ a$, Fig. 2, gives a side view with side removed.

A, the base of trough; B, the top or lid, which works on hinges $l\ l$, as will be seen in Fig. 2, so that it can be raised conveniently for cleaning; D, a hollow tube running through the end of trough-partition F, Fig. 1, and terminating at valve on $f$, a perpendicular arm of the main lever E, on which is attached a float, $h$, which works on a pin in block $i$. G is a partition to protect the valve, and also to strengthen the trough; $e$, in partition G, a hole for the water to pass into main trough.

Now the idea, as shown in the above, is to connect the apparatus, as seen in Fig. 1, after it is set in the ground, (or on the ground, as parties may think best,) to a tank, as is used by all farmers and others owning a windmill, the connection to be made by a pipe, of any length, attached to the water-tank, which, of course, must have a greater elevation than the trough, by means of which the water will be conveyed to the trough. The connecting-pipe is attached to the pipe D, through which the water flows unobstructed, as seen in Fig. 1, (dotted lines representing the valve open,) and passes through hole $e$ in partition G into main trough; the water rising in all parts of the trough at the same time as it flows back through partition F, through hole $e$, until it reaches float $h$, which gently rises, closing the pipe D, which remains closed until the water, or part of it, is drank out by stock through holes $d\ d$ in lid, when the float $h$ on lever E falls, and allows water again to flow through pipe D, thereby continually keeping a supply of pure water for stock.

$a\ a$, partition in lid, to give it strength and keep the head of stock apart; $b$, space in which the head is placed while drinking; $k$, a strip or brace running along on top of partitions $a\ a$ to give strength.

Fig. 2, superficial view, part removed, to show water-ways $e$.

A, base of trough; D, hollow tube; E, arm on which is attached float $h$; G, partition; F, partition; $e\ e$, water-ways; $d\ d$, space in lid for stock to drink, as seen in Fig. 3; $a\ a$, partition of lid.

Fig. 3, end view, end removed, showing stock in act of drinking.

What I claim is—

1. A trough with perpendicular sides and ends, divided by two partitions, covered by a perforated lid, attached to said trough by hinges.

2. A lever working on a bolt in slot of partition next to the end of the trough, to the long arm of which is attached the float $h$.

3. A perpendicular arm supported by a brace attached to the end of the lever to give strength, and having on its lower end a valve to close the pipe, said pipe running through partition and end of trough, to which is attached a pipe or hose.

4. The pipe running through the end of the trough and partition, as described.

5. The lid with holes, separated by partition, supported by brace on top, substantially as described in specification.

WILLIAM RILEY.

Witnesses:
 ROBERT BLACK,
 WILLIAM LATTIMER.